(No Model.) 2 Sheets—Sheet 1.
H. C. JOHNSON.
PROCESS OF AND APPARATUS FOR DEHYDRATING AND REFRIGERATING AIR FOR THE PRESERVATION OF MEATS, &c.
No. 328,685. Patented Oct. 20, 1885.
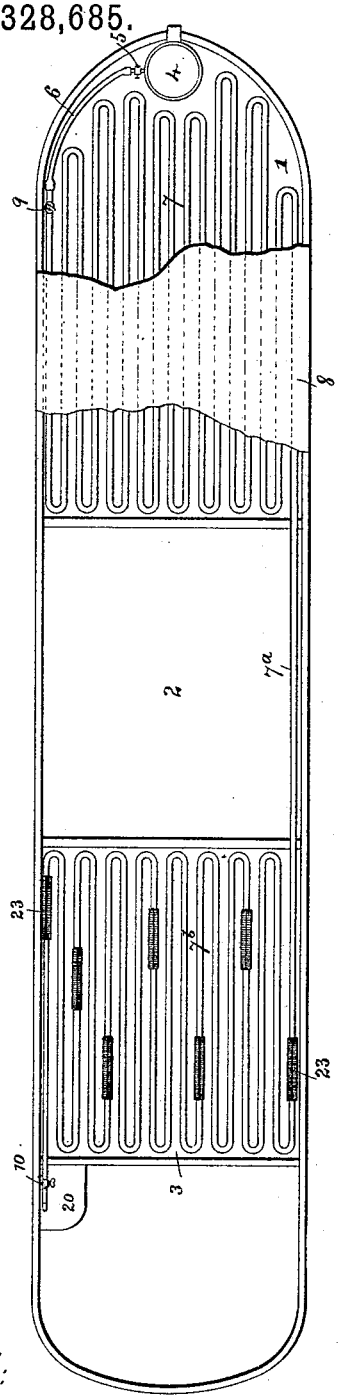
FIG. I.
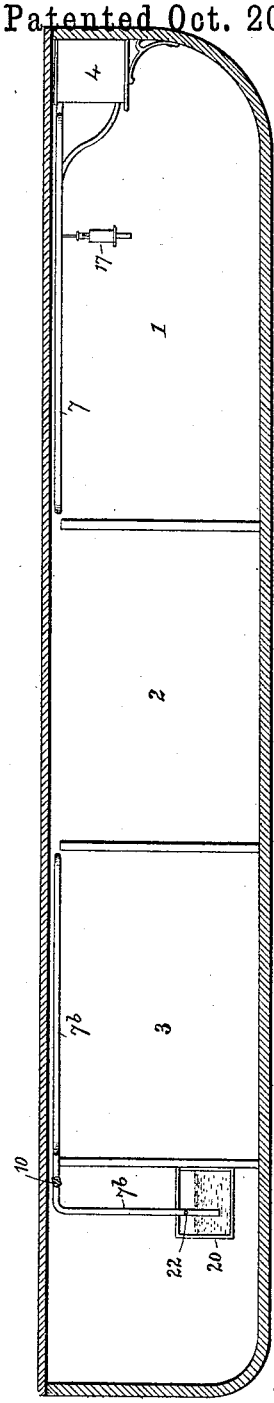
FIG. II.
Attest:
Geo. T. Smallwood
Samuel H. Knight
Inventor:
Henry C. Johnson.
By Knight Bros
Attys.

(No Model.) H. C. JOHNSON. 2 Sheets—Sheet 2.
PROCESS OF AND APPARATUS FOR DEHYDRATING AND REFRIGERATING
AIR FOR THE PRESERVATION OF MEATS, &c.
No. 328,685. Patented Oct. 20, 1885.
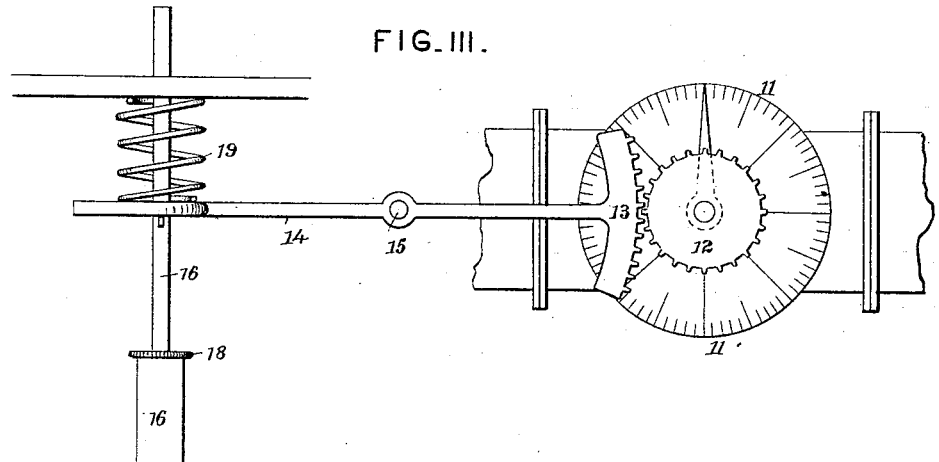
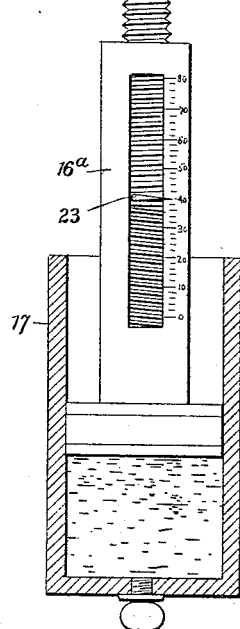
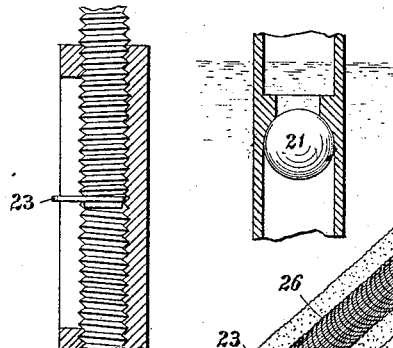
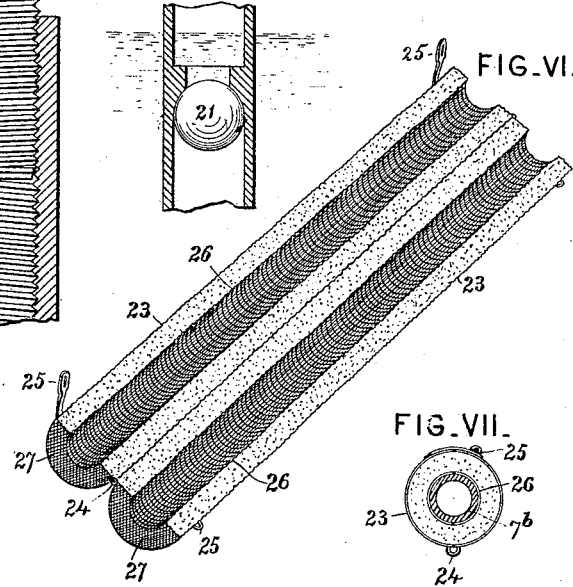
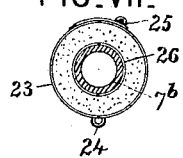

UNITED STATES PATENT OFFICE.

HENRY CLAY JOHNSON, OF MEADVILLE, PENNSYLVANIA.

PROCESS OF AND APPARATUS FOR DEHYDRATING AND REFRIGERATING AIR FOR THE PRESERVATION OF MEAT, &c.

SPECIFICATION forming part of Letters Patent No. 328,685, dated October 20, 1885.

Application filed July 27, 1885. Serial No. 172,799. (No model.)

*To all whom it may concern:*

Be it known that I, HENRY CLAY JOHNSON, a citizen of the United States, residing at Meadville, in the county of Crawford and State of Pennsylvania, have invented a new and useful Improvement in Processes and Apparatus for Dehydrating and Refrigerating Air for the Preservation of Meat, Fruit, and other Perishable Articles in Storage and Transportation, of which the following is a specification.

In connection with the apparatus described in Letters Patent No 316,975, granted to me the 5th day of May, 1885, I have found it desirable and important to secure the artificial drying or dehydration of the cooled air as a further means to preserving the meat or other perishable article, for the preservation of which the apparatus is employed. It has heretofore been proposed to employ in connection with refrigerating-tubes deliquescent salts contained in a jacket of wire-gauze; but this, as heretofore constructed or proposed to be constructed, was not applicable with requisite facility to cooling-conduits such as employed by me, nor were convenient means and appliances afforded for the ready renewal of the charge of deliquescent salts or other material around the cooling-conduit. It is well known that two conditions are necessary in order to properly preserve animal and vegetable substances by the refrigeratory processes: First, the air which surrounds the substances must be cool; secondly, it must be dry or free from moisture. By my invention as now perfected I provide practical, economical, and convenient means for maintaining both of these conditions. To this end I employ detachable holders or receivers for containing anhydrous ammonia or other cooling agent compressed in liquid form, placed in communication with cooling-conduits of coiled pipe or other suitable form, terminating in water-tanks for taking up the ammonia and retaining it for future use, on the well-known principle of the absorption of ammoniacal gas in water, which is availed of in apparatus of this description; and I further employ removable jackets in annular form consisting of inner and outer shells or tubes of perforated sheet metal, wire-gauze, or other suitable material, and adapted to contain within the annular space between the two concentric tubes any suitable deliquescent material—as, for example, chloride of sodium or common salt—the connected concentric tubes being divided longitudinally, and hinged at one side and connected on the opposite side by suitable clasps, so as to admit of the ready application and fastening of such annular jackets around the cooling-pipes. A convenient length for these removable jackets is from two to three feet, but their length, as well as their diameter and shape, may of course be varied, according to the dimensions and form of the cooling-conduit with which they are to be used. The inner and outer shells and the ends of the removable annular jackets are perforated or reticulated, and any necessary number of such jackets are used, according to the capacity of the chamber in which they are used or the volume of air to be dehydrated and refrigerated.

The invention is applicable to the preservation of meat, grain, fruits, and other perishable articles stored in warehouses, refrigerators, or elevators, or during transportation in boats or vessels of all kinds, or in railway-cars or other conveyances.

In order that the invention and the mode of carrying it into practical use may be fully understood, I will proceed to describe it in detail with reference to the accompanying drawings, in which—

Figure I is a plan or top view of a canal-boat with the invention applied, portions of the deck being removed to expose the cooling and dehydrating appliances. Fig. II is a vertical longitudinal section of the same. Fig. III is an elevation, partly in section, of a thermal regulator employed to control the temperature in the refrigerating-chambers and maintain the same at any degree desired. Fig. IV is a portion of the said regulator on a still larger scale. Fig. V is a detail sectional view, on a larger scale, representing the discharge end of the cooling-conduit within the water-tank, and a check-valve employed to prevent the influx of water or reflux of gas or air to the cooling pipe or conduit. Fig. VI is a perspective view, also on a larger scale, of one of the removable annular dehydrating-jackets divided and hinged, and provided with suitable clasps to facilitate its application to the cooling-pipe. Fig. VII is a transverse section, also on a larger scale, through the dehydrating-jacket and cooling-pipe, on the line VII VII, Fig. I.

As in my patent No. 316,975, above referred to, in applying this invention to canal-boats the boat may be made with a hold in any desirable number of compartments—1 2 3, for example—the central compartment, 2, being here represented as open at top for the reception of the hatch for loading and unloading. A removable receiver, 4, contains anhydrous ammonia condensed into liquid form by pressure and confined therein by a stop-cock, 5. This removable receiver 4 communicates through a hose, 6, with one end of a cooling-conduit, 7, which is preferably formed of a coiled pipe extending in any number of convolutions directly underneath the deck 8 of the compartment 1; then extending by a conducting pipe or section, 7$^a$, across the compartment 2 to the compartment 3, where it is formed in another series of convolutions, 7$^b$, beneath the deck at top of the said compartment 3. The cooling-conduit 7 7$^a$ 7$^b$ is provided with stop-cocks 9 10 at its respective ends, by which the cooling-gas may be imprisoned in said conduit when desired, or its flow therethrough regulated. It is also provided with a thermal regulator consisting of a dial-cock, 11, operated by a pinion, 12, and segment-gear 13, the latter mounted on the long arm of a lever, 14, fulcrumed at 15, and actuated through its shorter arm by a piston-rod, 16, adjustable in length and pressed upward by the expansion of mercury in the cylinder 17. The lower member, 16$^a$, of the piston-rod is made hollow and provided with an internal screw-thread, to receive an external thread on the rod 16, which is rotated by a thumb-collar, 18, to lengthen or shorten the rod, thus causing it to act with a greater or less effect upon the valve 11 under a given expansion of mercury in cylinder 17. A strong spring, 19, moves the lever 14 in the opposite direction as the mercury in the cylinder 17 contracts. By these means I am enabled to set the regulating apparatus so as to maintain a flow of cooling-gas through the conduit, regulated by the temperature of the apartment to be cooled, as I have more particularly described and claimed in another application of even date herewith. The pipe 7$^b$ terminates in a tank, 20, containing water, into which the ammonia is passed as it flows through the cooling-conduit.

In order to prevent the influx of water into the cooling-pipe, I provide at the discharge end of said pipe an automatic check-valve, 21, (shown in detail in Fig. V,) and also an aperture, 22, in the pipe 7$^b$, above the level of the water in the tank 20. The effect of the aperture 22, permitting a slight influx of air into the cooling-conduit 7$^b$, is to somewhat modify the force of the exhaust produced in the cooling-conduit by the condensation of the gas from contact with the water, and also to lessen the liability of even a slight influx of water into the conduit from the tank 20 before the check-valve has time to act. A pointer, 23, swiveled to the extremity of the adjustable piston-rod, enables the thermal regulator to be set to any temperature desired.

The annular dehydrating-jacket is constructed with an outer shell, 23, preferably of cylindrical form, divided longitudinally into two parts, connected at one side by hinges 24 and fastened together on the opposite side by suitable clasps, 25. Concentric with this outer tube, 23, is an inner tube, 26, also made in two parts, which are either permanently connected to the respective parts of the outer tube, 23, or adapted to be set into the same and removed at will. If the two parts of the inner tube, 26, are made detachable, this affords convenient means of charging the outer tube with chloride of sodium or other deliquescents. The ends of the space formed between the concentric tubes 23 26 are closed by semi-annular plates 27. The tubes 23 26 and end plates, 27, may be made of perforated sheet metal, or any or all of them may be made of wire-gauze, if preferred.

The mode of using the invention will be clearly understood from the above description. The inner tube or cylinder, 26, tightly clasping the cooling-conduit 7 7$^b$, provides for the contact therewith, so that the deliquescent salt is effectually cooled throughout its body, while the perforated or reticulated outer shell or tube, 23, permits the air to be cooled and dehydrated to penetrate throughout the body of deliquescent salt contained therein. The heat and moisture in the said air are rapidly taken up, and it is reduced to a dry state at a very low temperature, bringing it into the best possible condition for preserving any perishable articles contained within the chamber.

Any suitable and well-known material may be used for dehydrating the air by absorbing the moisture therefrom—as for example, chloride of sodium, chloride of calcium, or magnesia, caustic soda, &c.

Having thus described my invention, the following is what I claim as new therein, and desire to secure by Letters Patent—

1. The cooling and dehydrating apparatus herein described, consisting of a cooling-conduit, 7, connecting at one end with a holder for ammoniacal gas, and at the other with a water-tank and one or more removable jackets, 23, for holding dehydrating material, as explained.

2. The combination of the gas-holder 4, cooling-conduit 7 7$^a$ 7$^b$, water-tank 20, and dehydrating-jackets 23, as and for the purposes set forth.

3. The combination of the gas-holder 4, cooling-conduit 7 7ª 7ᵇ, stop-cocks 9 10, and removable dehydrating-jackets 23 26, as and for the purposes described.

4. The dehydrating-jacket consisting, as herein described, of two semi-cylindrical shells, 23 26, with hinges 24 and clasps 25, substantially as and for the purposes set forth.

5. The combination, with a cooling-conduit for refrigerating air, of a removable dehydrating-jacket for containing deliquescent material, divided longitudinally and hinged, as described, to permit its ready application to and removal from the cooling-conduit.

HENRY CLAY JOHNSON.

Witnesses:
NORMAN M. JOHNSON,
ARCHIE K. JOHNSTONE.